(12) United States Patent
Zhang et al.

(10) Patent No.: US 11,970,424 B1
(45) Date of Patent: Apr. 30, 2024

(54) EQUIPMENT AND METHOD FOR PREPARING AEROGEL THERMAL INSULATION MORTAR FOR HIGH TEMPERATURE KILN

(71) Applicant: CNBM Technology Innovation Academy (Shandong) Co., Ltd., Zaozhuang (CN)

(72) Inventors: Zhonglun Zhang, Zaozhuang (CN); Mingming Wang, Zaozhuang (CN); Zhijun Xin, Zaozhuang (CN)

(73) Assignee: CNBM Technology Innovation Academy (Shandong) Co., Ltd., Zaozhuang (CN)

( * ) Notice: Subject to any disclaimer, the term of this patent is extended or adjusted under 35 U.S.C. 154(b) by 0 days.

(21) Appl. No.: 18/453,104

(22) Filed: Aug. 21, 2023

(30) Foreign Application Priority Data

Oct. 12, 2022 (CN) .......................... 202211247800.4

(51) Int. Cl.
 *C04B 28/00* (2006.01)
 *C04B 38/00* (2006.01)
 (Continued)

(52) U.S. Cl.
 CPC ........ *C04B 28/005* (2013.01); *C04B 38/0045* (2013.01); *F27D 1/0003* (2013.01);
 (Continued)

(58) Field of Classification Search
 CPC .. C04B 28/005; C04B 38/0045; F27D 1/0003
 See application file for complete search history.

(56) References Cited

U.S. PATENT DOCUMENTS

2016/0045841 A1* 2/2016 Kaplan .................. C01B 32/05
 429/49
2016/0238279 A1* 8/2016 Jeon ......................... F24H 9/06

FOREIGN PATENT DOCUMENTS

CN   209613098 U   11/2019
CN   211967949 U   11/2020
 (Continued)

OTHER PUBLICATIONS

Title of the Item: Chinese excellent master's dissertation full text database Engineering Science and Technology Iseries Publication Date: Jan. 15, 2019 Name of the Author: Li Chengli Article Title: Preparation of Al2O3/SiO2 Composite Aerogels and High Temperature Properties.

*Primary Examiner* — Anshu Bhatia
(74) *Attorney, Agent, or Firm* — Nitin Kaushik (57) ABSTRACT

The present invention specifically relates to equipment and a method for preparing an aerogel thermal insulation mortar for a high-temperature kiln thereof. The equipment comprises a top box, a support frame platform, a processing mechanism, an agitation mechanism, a receiving mechanism and a docking mechanism, wherein the top box is provided with a partition frame capable of dividing an inner space thereof into a first material discharge cavity, a second material discharge cavity, a third material discharge cavity and a fourth material discharge cavity respectively; the receiving mechanism is mounted on an inner top of the support frame platform and docked with the top box; the docking mechanism is mounted on the receiving mechanism; an inner bottom of the support frame platform is provided with a collection box; one side of the top box is provided with a door panel.

2 Claims, 12 Drawing Sheets

(51) Int. Cl.
*F27D 1/00* (2006.01)
*C04B 111/28* (2006.01)
*C04B 111/40* (2006.01)

(52) U.S. Cl.
CPC ....... *C04B 2111/28* (2013.01); *C04B 2111/40* (2013.01); *C04B 2201/32* (2013.01)

(56) References Cited

FOREIGN PATENT DOCUMENTS

| | | |
|---|---|---|
| CN | 212580178 U | 2/2021 |
| CN | 113043468 A | 6/2021 |
| CN | 216396241 U | 4/2022 |

\* cited by examiner

EQUIPMENT AND METHOD FOR PREPARING AEROGEL THERMAL INSULATION MORTAR FOR HIGH TEMPERATURE KILN

CROSS-REFERENCE TO RELATED APPLICATIONS

The application claims priority to Chinese patent application No. 202211247800.4, filed on Oct. 12, 2022, the entire contents of which are incorporated herein by reference.

TECHNICAL FIELD

The present invention relates to the technical field of thermal insulation mortar preparation equipment, particularly to equipment and a method for preparing aerogel thermal insulation mortar for a high temperature kiln.

BACKGROUND

An aerogel is a lightweight nano-solid material composed of nano-scale ultrafine particles aggregated to form a nanoporous network structure and filled with gaseous dispersion medium in the pores of the network. It has a porosity of as high as 99.8%, a typical pore size of 1-40 nm, a specific surface area of 400-1200 $m^2/g$, a density of as low as 3 $kg/m^3$, and thermal conductivity at room temperature of as low as 0.010 $W/(m \cdot K)$ or less, exhibiting excellent lightness, light transmittance, thermal insulation, thermal insulation, sound insulation, fire resistance, impact resistance, and chemical stability and incombustibility. It is due to these characteristics that aerogel materials have very broad application potential in thermal, acoustic, optical, microelectronic, particle detection, and other aspects. In order to ensure small heat loss and energy saving, the aerogel insulation material for an existing high-temperature kiln is also used in the kiln field.

The Chinese utility model patent with the patent number CN211886839 U discloses equipment for preparing an aerogel composite material, comprising a preparation box. Support legs are fixedly mounted on a lower side of the preparation box; a feed pipe is provided on one side of the preparation box; a first valve is provided inside the feed pipe; a first motor is fixedly mounted on an upper side of the preparation box; an output end of the first motor is fixedly connected to a transmission shaft; a first stirring rod and a second stirring rod are fixedly mounted on the outer side of the transmission shaft; and stirring blades are fixedly connected between the first stirring rod and the second stirring rod; a second valve is provided at the bottom of the preparation box; and a lower hopper is fixedly connected to a lower side of the preparation box. The equipment, through the provision of the first motor, the transmission shaft, the first stirring rod, the second stirring rod, and the stirring blade, the operation of stirring the reactants in the preparation box is realized by the operation of the first motor driving the rotation of the stirring blade, so that the reactants are fully contracted, accelerating the progress speed of the reaction, improving the reaction rate, and improving the practicality of the device. Although a certain production effect of the aerogel composite material can be achieved, there are the following disadvantages in the actual use process: firstly, the raw materials in the production process of aerogel composite materials cannot be processed automatically, resulting in poor mixing efficiency and effect of subsequent raw materials and low overall applicability; secondly, the overall structure of the equipment is relatively simple, and it cannot achieve automatic loading and unloading in connection with each step in the production process of the aerogel thermal insulation mortar, with low overall practicality.

SUMMARY

The object of the present invention is to provide equipment and a process for preparing an aerogel thermal insulation mortar for a high-temperature kiln, so as to solve the problems proposed in the above-mentioned background art that an automatic processing operation cannot be performed on raw materials of an aerogel composite in a production process, resulting in poor mixing efficiency and effect of subsequent raw materials, low overall applicability, and a relatively simple overall structure of the equipment, and operations such as automatic loading and unloading in connection with each step in the production process cannot be completed, and low practicality.

The present invention provides equipment for preparing an aerogel thermal insulation mortar for a high-temperature kiln, including a top box, a support frame platform, a processing mechanism, an agitation mechanism, a receiving mechanism and a docking mechanism, wherein the top box is mounted on the top of the support frame platform; the top box is provided with a partition frame capable of respectively dividing an inner space thereof into a first material discharge cavity, a second material discharge cavity, a third material discharge cavity and a fourth material discharge cavity; the processing mechanism is provided on the top of the top box and the bottom of the processing mechanism is provided in the top box; the agitation mechanism is mounted on the partition frame and is located at an inner bottom of the top box; the receiving mechanism is mounted on an inner top of the support frame platform and docked with the top box; the docking mechanism is mounted on the receiving mechanism; an inner bottom of the support frame platform is provided with a collection box docked with the receiving mechanism; one side of the top box is provided with a door panel.

Further, the processing mechanism includes a lifting assembly, a material storage assembly, and a filter screen, wherein the lifting assembly is mounted at the top of the top box; the material storage assembly is arranged at an inner top of the third material discharge cavity and is docked with the filter screen; the filter screen is of a semi-spherical structure and is slidably mounted on a side wall of the partition frame; the filter screen is located in the fourth material discharge cavity.

Further, the lifting assembly includes a driving cylinder, a mounting plate, a connecting plate, a driving motor, and a hemispherical grinding body, wherein the mounting plate is fixed on the top of the top box; the driving cylinder is fixed on the top of the mounting plate; the top of the mounting plate is connected to an output end of the driving cylinder; the driving motor is fixed on the connecting plate; an output end of the driving motor is connected to the top of the hemispherical grinding body.

Further, the material storage assembly includes a material storage guide box, a rotating plate, and a rotating motor, wherein the top of the top box is provided with a material port in communication with the material storage guide box; one side of the material storage guide box is provided with a docking port; the rotating plate is rotatably arranged at the docking port; the rotating motor is mounted on one side wall of the material storage guide box; an output end of the rotating motor is connected to the rotating plate.

Further, the agitation mechanism includes a rotating blade, a connecting shaft, a connecting seat, a driven bevel gear, a driving bevel gear, and a stepping motor, wherein the stepping motor is located in the third material discharge cavity and is fixed on the partition frame (11); the driving bevel gear is located in the fourth material discharge cavity and is connected to an output end of the stepping motor; the driven bevel gear is fixed on the top end of the connecting shaft; the driven bevel gear meshes with the driving bevel gear; and the rotating blade is fixed at a bottom end of the connecting shaft.

Further, the receiving mechanism includes an outer cylinder, a transmission assembly, an inner cylinder, and two bearing seats, wherein the two bearing seats are mounted on the support frame platform at intervals; the transmission assembly is fixed on the support frame platform and extends to the inner cylinder for arrangement; two ends of the outer cylinder are respectively connected to the two bearing seats; the inner cylinder is arranged within the outer cylinder; the inner cylinder is of a hollow structure; and an outer side wall of the outer cylinder is provided with an agent inlet pipe in communication with the inner cylinder.

Further, the transmission assembly includes an L-shaped plate, a driving toothed disc, a transmission motor, a driven toothed disc and a transmission shaft, wherein the L-shaped plate is fixed on an inner side wall of the support frame platform; the transmission motor is fixed on the L-shaped plate and an output end of the transmission motor is connected to the driving toothed disc; the transmission shaft is rotatably arranged on the outer cylinder; one end of the transmission shaft is connected to the driven toothed disc; the driven toothed disc meshes with the driving toothed disc; a rotary vane is provided on the transmission shaft; one end of the rotary vane is in contact with an inner side wall of the inner cylinder; both ends of the outer cylinder are provided with an exhaust mesh; and both the outer cylinder and the inner cylinder are provided with an upper inlet and a lower outlet.

Further, the docking mechanism includes a guide pipe, a control valve, an upper control assembly and a lower control assembly, wherein two ends of the guide pipe are respectively in communication with the top box and the upper inlet; the control valve is fixed on the guide pipe; the upper control assembly and lower control assembly have the same structure; and the upper control assembly is fixed on an inner top of the support frame platform and cooperates with the upper inlet, and the lower control assembly is fixed on the support frame platform and cooperates with the lower outlet.

Further, the upper control assembly includes an arc-shaped plate, a boss, a guide wheel, a bearing plate, and a linkage motor, wherein the arc-shaped plate is arranged in the inner cylinder; the boss is fixed on an outer side wall of the arc-shaped plate; the bearing plate is fixed on the support frame platform; the linkage motor is fixed on the bearing plate and an output end of the linkage motor is connected to the guide wheel; and the outer side wall of the guide wheel is provided with a linkage block connected thereto, and one end of the linkage block is connected to the boss.

The present invention provides a process for preparing an aerogel thermal insulation mortar for a high-temperature kiln, including the steps:

S1, feeding an adhesive, an aerogel powder, a reinforcing agent, and a liquid solvent to the inner bottom of the top box (1) from the first material discharge cavity (7) and the second material discharge cavity (8) respectively, at the same time, (323) driving, via the rotating motor, the rotating plate (322) to rotate and open the docking port, so that the obtained polyphenyl particles located in the material storage guide box (321) fall from the rotating plate (322) into the filter screen (33), and secondly, driving, via the driving cylinder (311), the driving motor (314) on the connecting plate (313) to move downwards; and driving, via the driving motor (314), the hemispherical grinding body (315) connected to an output end thereof to rotate, and then grinding the polyphenyl particles, which then falls from a mesh of the filter screen (33) to the inner bottom of the top box (1);

S2, driving, via the stepping motor (46), the driving bevel gear (45) connected to an output end thereof to rotate, driving the driven bevel gear (44) meshing with the driving bevel gear (45) to rotate, and synchronously rotating the connecting shaft (42) connected to the driven bevel gear (44) and the rotating blade (41) at any time, to fully mix each raw material located in the inner bottom of the top box (1) and obtain an aerogel thermal insulation mortar;

S3, controlling, via the control valve (62), the guide pipe (61) to open, and controlling, via the upper control assembly (63), the upper inlet to open, so that the aerogel thermal insulation mortar enters the inner cylinder (53) from the guide pipe (61), and the exhaust meshes (511) provided at the two ends of the outer cylinder (51) are capable of discharging the gas during the production process of the aerogel thermal insulation mortar;

S4, driving, via the transmission motor (523), the driving toothed disc (522) connected to an output end thereof to rotate, driving the driven toothed disc (524) engaged with the driving toothed disc (522) to rotate, and in turn, the rotary vane (526) on the transmission shaft (525) to rotate synchronously, so as to mix and flow the aerogel thermal insulation mortar located in the inner cylinder (53), improving the mixing efficiency and effect thereof; and S5, when the mixing of the aerogel thermal insulation mortar is completed, controlling, via the lower control assembly (64), the lower outlet to be open, so that the aerogel enters the collection box (12) from the lower outlet, and the whole preparation and collection operation of the aerogel thermal insulation mortar is completed.

The present invention provides an aerogel thermal insulation mortar preparation apparatus for a high-temperature kiln and a process thereof by improving the present invention, having the following improvements and advantages over the prior art:

I: in the present invention, an adhesive, an aerogel powder, a reinforcing agent, and a liquid solvent are fed to the inner bottom of the top box from the first material discharge cavity and the second material discharge cavity respectively, at the same time, the rotating motor drives the rotating plate to rotate and open the docking port, so that the obtained polyphenyl particles located in the material storage guide box fall from the rotating plate into the filter screen. Secondly, the driving cylinder drives the driving motor on the connecting plate to move downwards. The driving motor drives the hemispherical grinding body connected to an output end thereof to rotate. Then the aerogel is ground and then falls from a mesh of the filter screen to the inner bottom of the top box. The automatic loading and mixing of aerogel powder at the first stage are completed, and the raw material particles can be automatically ground, improving the mixing efficiency of subsequent aerogel thermal insulation mortar without manual operation.

II. In the present invention, the control valve controls the guide pipe to be open, and the upper control assembly operates to control the opening of the upper inlet, so that the aerogel thermal insulation mortar enters from the guide pipe into the inner cylinder. The exhaust mesh provided at the two ends of the outer cylinder can discharge the gas of the aerogel thermal insulation mortar during the production process. Then the lower control assembly controls the lower outlet to be open, so that the aerogel thermal insulation mortar enters from the lower outlet into the collection box, and the preparation and collection operations of the whole aerogel thermal insulation mortar are completed, and thus the automatic loading and unloading of the connection between various steps in the production process of the aerogel thermal insulation mortar can be realized, and the overall adaptability of the equipment is improved.

BRIEF DESCRIPTION OF DRAWINGS

The present invention will now be further explained with reference to the accompanying drawings and examples.

REFERENCE SIGNS 1, top box; 2, support frame platform; 3, processing mechanism; 31, lifting assembly; 311, driving cylinder; 312, mounting plate; 313, connecting plate; 314, driving motor; 315, hemispherical grinding body; 32, material storage assembly; 321, material storage guide box; 322, rotating plate; 323, rotating motor; 33, filter screen; 4, agitation mechanism; 41, rotating blade; 42, connecting shaft; 43, connecting seat; 44, driven bevel gear; 45, driving bevel gear; 46, stepping motor; 5, receiving mechanism; 51, outer cylinder; 511, exhaust mesh; 52, transmission assembly; 521, L-shaped plate; 522, driving toothed disc; 523, transmission motor; 524, driven toothed disc; 525, transmission shaft; 526, rotary vane; 53, inner cylinder; 54, bearing seat; 56, agent inlet pipe; 6, docking mechanism; 61, guide pipe; 62, control valve; 63, upper control assembly; 631, arc-shaped plate; 632, boss; 633, guide wheel; 634, bearing plate; 635, linkage motor; 636, linkage block; 64, lower control assembly; 7, first material discharge cavity; 8, second material discharge cavity; 9, third material discharge cavity; 10, fourth material discharge cavity; 11, partition frame; 12, collection box; and 13, door panel.

DETAILED DESCRIPTION OF THE EMBODIMENTS

The following provides a detailed explanation of the present invention. The technical solutions in the embodiments of the present invention will be described clearly and completely. Obviously, the described embodiments are only a part of the embodiments of the present invention, rather than all the embodiments. Based on the embodiments of the present invention, all Other embodiments obtained by a person of ordinary skill in the art without inventive effort fall within the scope of the present invention.

Example 1

Disclosed in this example is an aerogel thermal insulation mortar for a high temperature kiln, the material being prepared using the apparatus of claim 1. The material has a composite aerogel thermal conductivity (average temperature 25° C.) of 0.022-0.029 W/m·K, a thermal conductivity (average temperature 300° C.) of 0.042-0.050 W/m·K, and a thermal conductivity (average temperature 800° C.) of 0.078-0.085 W/m·K, and the specific preparation process is as follows: firstly preparing a saturated aluminum chloride hexahydrate ($AlCl_3 \cdot 6H_2O$) solution, uniformly mixing $AlCl_3 \cdot 6H_2O$, TEOS, anhydrous ethanol and deionized water in a molar ratio of 8-10:1:16-20: 16-20, stirring at normal temperature for 60 minutes, then according to TEOS and propylene oxide (PO) in a molar ratio of 1:9-12, adding propylene oxide and stirring for 5-10 minutes, stopping the stirring after the solution changes color, and standing at room temperature to obtain a composite alcohol gel; and aging the alcohol gel in constant temperature water bath at 50° C. for 24 hours using anhydrous ethanol as aging solution, and performing supercritical drying to obtain the $Al_2O_3$—$SiO_2$ composite aerogel.

Example 2

Figure 1:
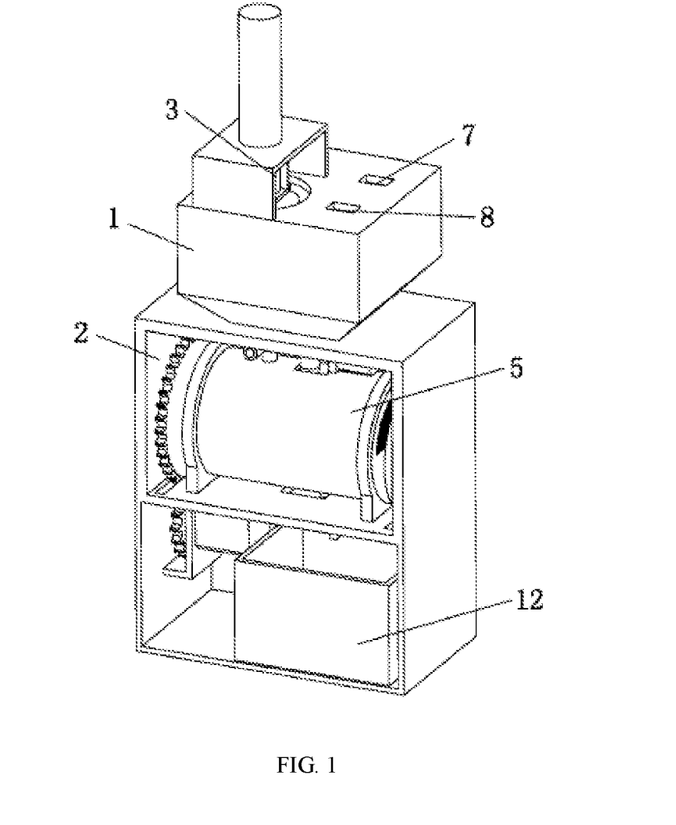
FIG. 1 is a schematic perspective view I of the present invention.
Figure 2:
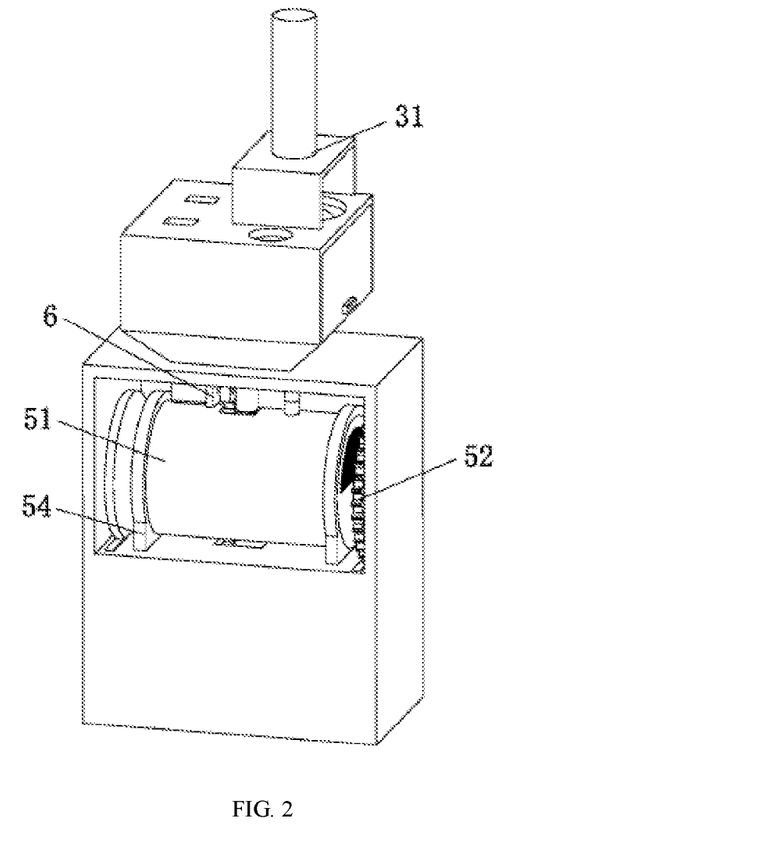
FIG. 2 is a schematic perspective view II of the present invention.
Figure 3:
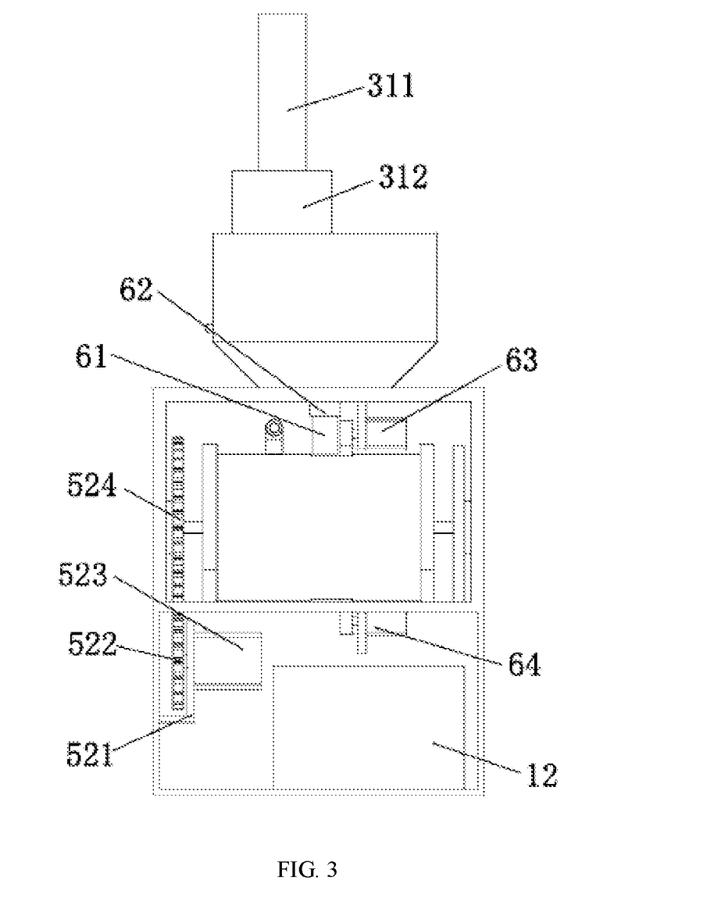
FIG. 3 is a front view of the present invention.
Figure 4:
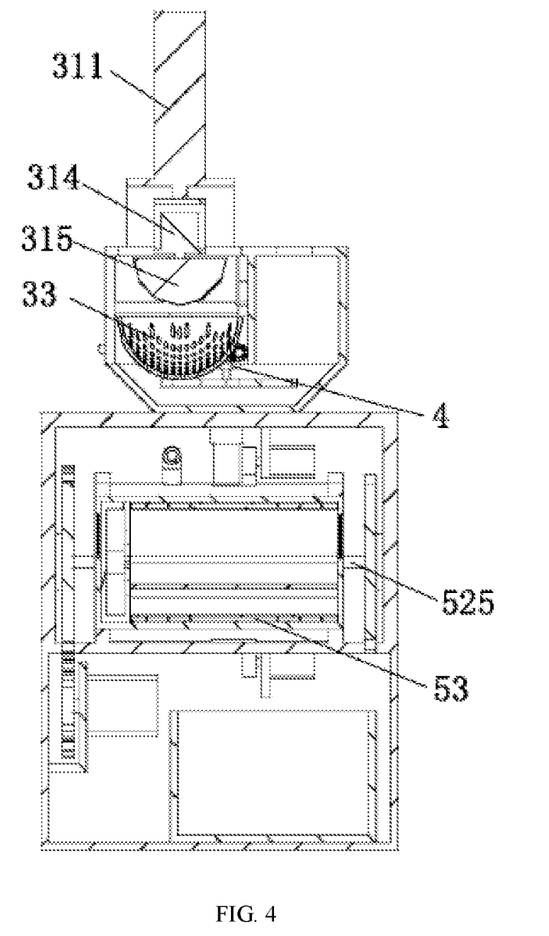
FIG. 4 is a cut view of the present invention.
Figure 5:
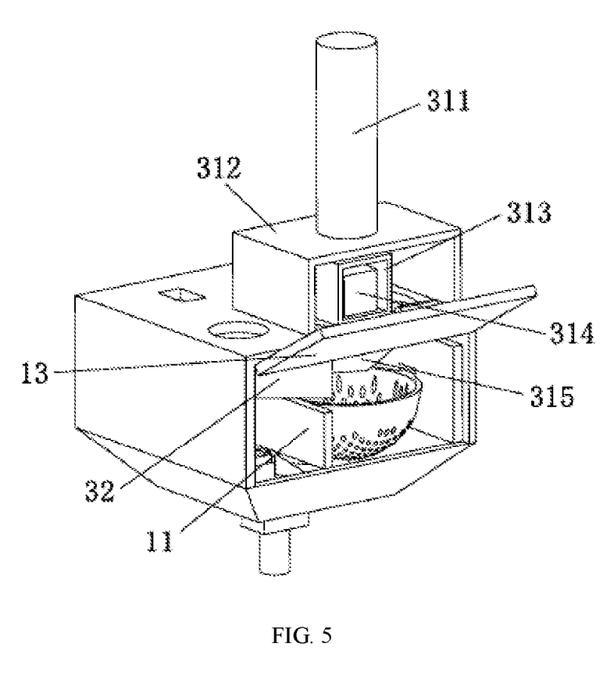
FIG. 5 is a schematic partial perspective view of the present invention.
Figure 6:
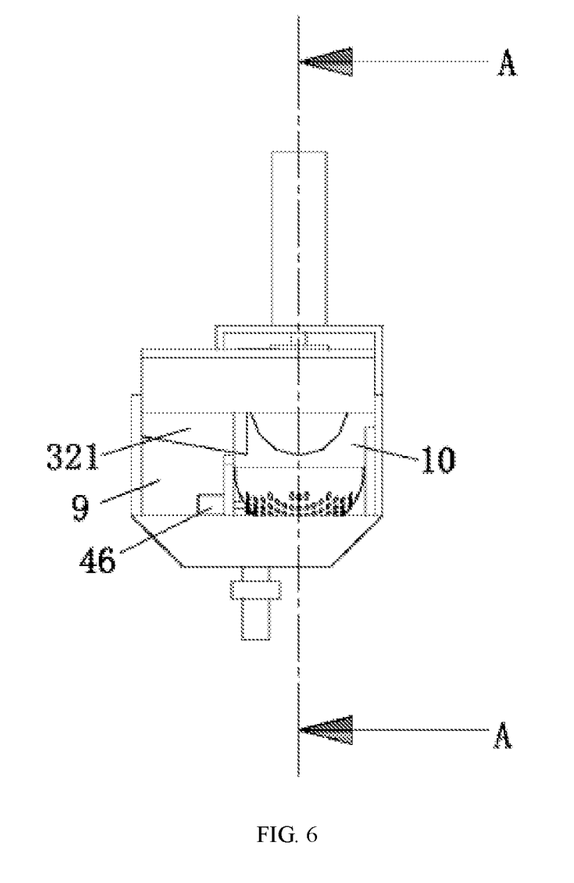
FIG. 6 is a cut view of the present invention of FIG. 5.
Figure 7:
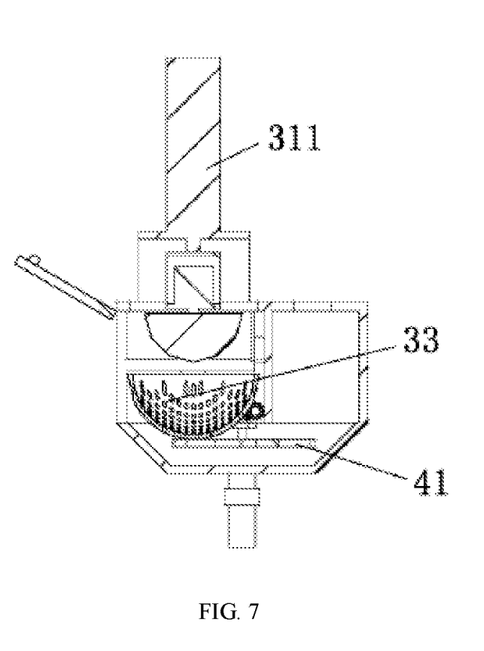
FIG. 7 is a cut view along line A-A of the present invention of FIG. 6.
Figure 8:
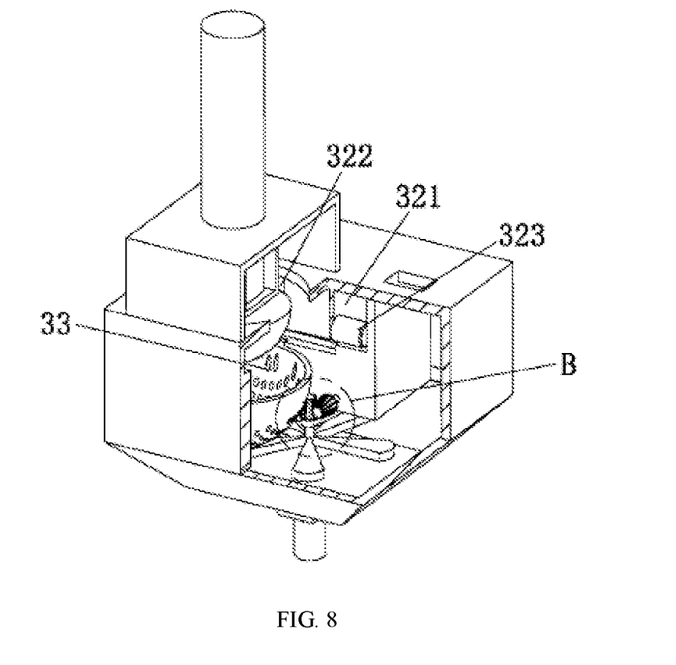
FIG. 8 is a schematic partial perspective cut view of the present invention.
Figure 9:
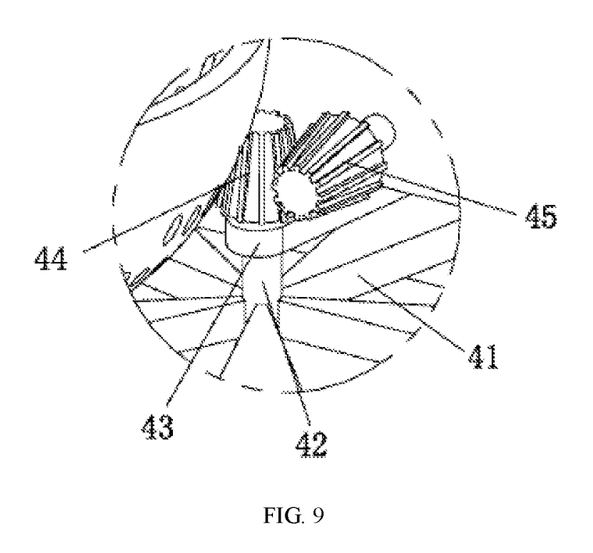
FIG. 9 is an enlarged view of portion B of FIG. 8 of the present invention.
Figure 10:
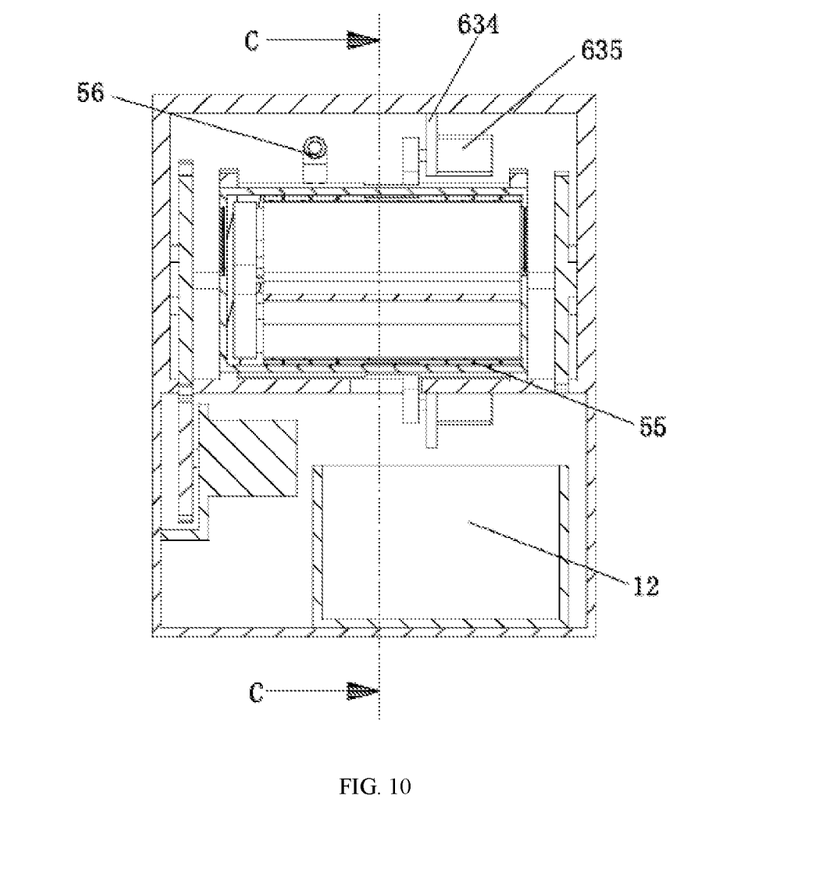
FIG. 10 is a partial cut view of the present invention.
Figure 11:
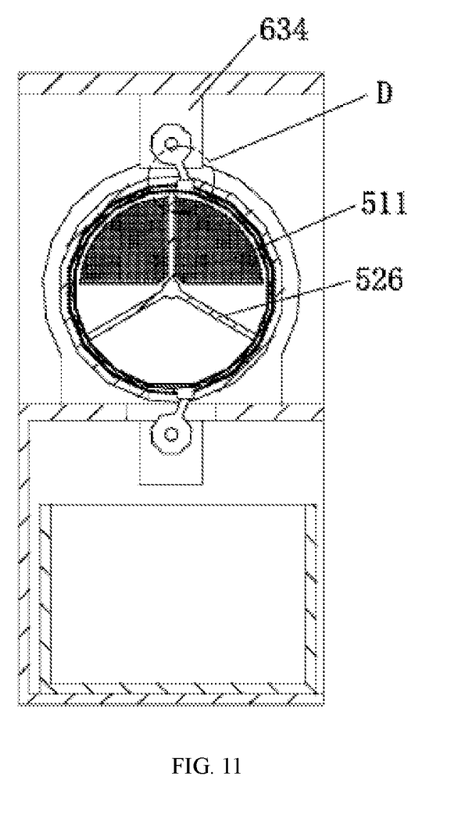
FIG. 11 is a cut view along line C-C of the present invention of FIG. 10.
Figure 12:
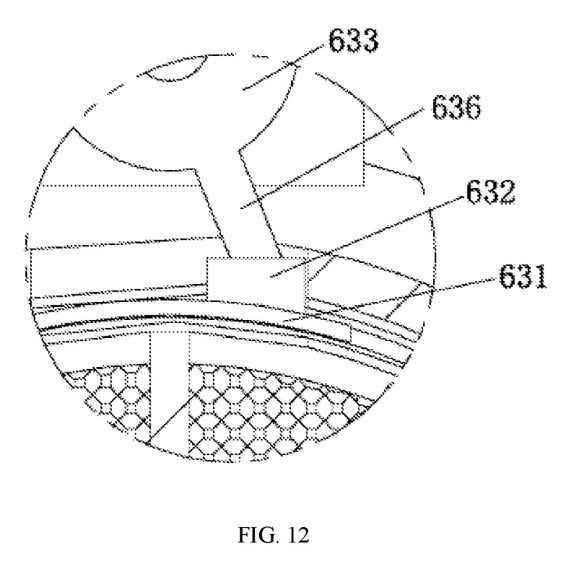
FIG. 12 is an enlarged view of portion D of FIG. 11 of the present invention.

As shown in FIGS. 1-12, this example discloses equipment for preparing an aerogel thermal insulation mortar for a high-temperature kiln, including a top box 1, a support frame platform 2, a processing mechanism 3, an agitation mechanism 4, a receiving mechanism 5 and a docking mechanism 6. The top box 1 is mounted on the top of the support frame platform 2. The top box 1 is provided with a partition frame 11 capable of respectively dividing an inner space thereof into a first material discharge cavity 7, a second material discharge cavity 8, a third material discharge cavity 9 and a fourth material discharge cavity 10. The processing mechanism 3 is provided on the top of the top box 1 and the bottom of the processing mechanism 3 is provided in the top box 1. The agitation mechanism 4 is mounted on the partition frame 11 and is located at an inner bottom of the top box 1. The receiving mechanism 5 is mounted on an inner top of the support frame platform 2 and docked with the top box 1. The docking mechanism 6 is mounted on the receiving mechanism 5. An inner bottom of the support frame platform 2 is provided with a collection box 12 docked with the receiving mechanism 5. One side of the top box 1 is provided with a door panel 13.

Specifically, the processing mechanism 3 includes a lifting assembly 31, a material storage assembly 32, and a filter screen 33. The lifting assembly 31 is mounted at the top of the top box 1. The material storage assembly 32 is arranged at an inner top of the third material discharge cavity 9 and is docked with the filter screen 33. The filter screen 33 is of a semi-spherical structure and is slidably mounted on a side wall of the partition frame 11. The filter screen 33 is located in the fourth material discharge cavity 10. Each raw material in the first stage of the aerogel powder can be automatically dropped and ground by means of the cooperation between the material storage assembly 32, the lifting assembly 31, and the filter screen 33. The mixing efficiency and effect between subsequent raw materials are improved, wherein the door panel 13 of the side wall of the top box 1 and the filter screen 33 are slidably mounted on the side wall of the partition frame 11, and the filter screen 33 can be periodically cleaned to prevent the occurrence of clogging.

Specifically, the lifting assembly 31 includes a driving cylinder 311, a mounting plate 312, a connecting plate 313, a driving motor 314, and a hemispherical grinding body 315. The mounting plate 312 is fixed on the top of the top box 1. The driving cylinder 311 is fixed on the top of the mounting plate 312. The top of the mounting plate 312 is connected to an output end of the driving cylinder 311. The driving motor 314 is fixed on the connecting plate 313; an output end of the driving motor 314 is connected to the top of the hemispherical grinding body 315. When the material storage assembly 32 works, the material to be ground falls into the filter screen 33. The driving cylinder 311 drives the driving motor 314 on the connecting plate 313 to move downwards, and the driving motor 314 drives the hemispherical grinding body 315 connected to an output end thereof to rotate, and then the raw materials are mixed, and fall from a mesh of the filter screen 33 to the inner bottom of the top box 1 to complete the automatic mixing of the raw materials, so as to improve the mixing efficiency and effect of the subsequent aerogel without manual operation.

Specifically, the material storage assembly 32 includes a material storage guide box 321, a rotating plate 322, and a rotating motor 323. The top of the top box 1 is provided with a material port in communication with the material storage guide box 321. One side of the material storage guide box 321 is provided with a docking port. The rotating plate 322 is rotatably arranged at the docking port. The rotating motor 323 is mounted on one side wall of the material storage guide box 321. An output end of the rotating motor 323 is connected to the rotating plate 322. The rotating motor 323 drives the rotating plate 322 to rotate so as to open the docking port, so that the obtained raw materials located in the material storage guide box 321 falls from the rotating plate 322 into the filter screen 33, and the step of automatically loading the raw materials to be mixed is completed.

Specifically, the agitation mechanism 4 includes a rotating blade 41, a connecting shaft 42, a connecting seat 43, a driven bevel gear 44, a driving bevel gear 45, and a stepping motor 46. The stepping motor 46 is located in the third material discharge cavity 9 and is fixed on the partition frame 11. The driving bevel gear 45 is located in the fourth material discharge cavity 10 and is connected to an output end of the stepping motor 46. The driven bevel gear 44 is fixed on the top end of the connecting shaft 42. The driven bevel gear 44 meshes with the driving bevel gear 45. The rotating blade 41 is fixed at a bottom end of the connecting shaft 42. The driving bevel gear 45 connected to an output end thereof is driven to rotate by the stepping motor 46, the driven bevel gear 44 meshing with the driving bevel gear 45 is driven to rotate, and the connecting shaft 42 connected to the driven bevel gear 44 and the rotating blade 41 are synchronously rotated at any time, so that each raw material located in the inner bottom of the top box 1 is fully mixed, and an aerogel thermal insulation mortar is obtained.

Specifically, the transmission assembly 52 includes an L-shaped plate 521, a driving toothed disc 522, a transmission motor 523, a driven toothed disc 524 and a transmission shaft 525. The L-shaped plate 521 is fixed on an inner side wall of the support frame platform 2. The transmission motor 523 is fixed on the L-shaped plate 521 and an output end of the transmission motor 523 is connected to the driving toothed disc 522. The transmission shaft 525 is rotatably arranged on the outer cylinder 51. One end of the transmission shaft 525 is connected to the driven toothed disc 524. The driven toothed disc 524 meshes with the driving toothed disc 522. A rotary vane 526 is provided on the transmission shaft 525; one end of the rotary vane 526 is in contact with an inner side wall of the inner cylinder 53. Both ends of the outer cylinder 51 are provided with an exhaust mesh 511. Both the outer cylinder 51 and the inner cylinder 53 are provided with an upper inlet and a lower outlet. The transmission motor 523 drives the driving toothed disc 522 connected with output end thereof to rotate, which brings the driven toothed disc 524 engaged with the driving toothed disc 522 to rotate. Then the rotary vanes 526 on the transmission shaft 525 rotate synchronously so that the aerogel thermal insulation mortar located in the inner cylinder 53 can be mixed and flow, improving the mixing efficiency and effect. The exhaust mesh 511 arranged at both ends of the outer cylinder 51 can discharge the gas generated during the production of aerogel thermal insulation mortar. The docking mechanism 6 can realize the automatic opening and closing control of the upper inlet and the lower outlet.

Specifically, the docking mechanism 6 includes a guide pipe 61, a control valve 62, an upper control assembly 63 and a lower control assembly 64. Two ends of the guide pipe 61 are respectively in communication with the top box 1 and the upper inlet. The control valve 62 is fixed on the guide pipe 61. The upper control assembly 63 and lower control assembly 64 have the same structure. The upper control assembly 63 is fixed on an inner top of the support frame platform 2 and cooperates with the upper inlet, and the lower control assembly 64 is fixed on the support frame platform 2 and cooperates with the lower outlet. The guide pipe 61 is controlled to open by the control valve 62. The upper control assembly 63 works to control the opening of the upper inlet, so that the aerogel thermal insulation mortar enters the inner cylinder 53 from the guide pipe 61, and then the lower control assembly 64 controls the opening and closing of the lower outlet to complete the automatic loading of the aerogel thermal insulation mortar.

Specifically, the upper control assembly 63 includes an arc-shaped plate 631, a boss 632, a guide wheel 633, a bearing plate 634 and a linkage motor 635. The arc-shaped plate 631 is arranged in the inner cylinder 53. The boss 632 is fixed on an outer side wall of the arc-shaped plate 631. The bearing plate 634 is fixed on the support frame platform 2. The linkage motor 635 is fixed on the bearing plate 634 and an output end of the linkage motor 635 is connected to the guide wheel 633. The outer side wall of the guide wheel 633 is provided with a linkage block 636 connected thereto, and one end of the linkage block 636 is connected to the boss 632. The linkage motor 635 drives the guide wheel 633 connected to an output end thereof and the linkage block 636 fixed on the guide wheel 633 to rotate, thereby driving the boss 632 and the arc-shaped plate 631 connected to one end of the linkage block 636 to rotate in the inner cylinder 53, thereby achieving the automatic opening and closing control of the upper inlet and the lower outlet on the inner cylinder 53 without manual operation, improving the production efficiency of the aerogel thermal insulation mortar. The equipment has strong overall adaptability.

According to the present invention, provided is a process for preparing an aerogel insulation material for a high temperature kiln, the process including the steps:

S1, feeding an adhesive, an aerogel powder, a reinforcing agent, and a liquid solvent to the inner bottom of the top box 1 from the first material discharge cavity 7 and the second material discharge cavity 8 respectively, at the same time, 323 driving, via the rotating motor, the rotating plate 322 to rotate and open the docking port, so that the obtained polyphenyl particles located in the material storage guide box 321 fall from the rotating plate 322 into the filter screen 33, and secondly, driving, via the driving cylinder 311, the driving motor 314 on the connecting plate 313 to move downwards; and driving, via the driving motor 314, the hemispherical grinding body 315 connected to an output end thereof to rotate, and then grinding the polyphenyl particles, which then falls from a mesh of the filter screen 33 to the inner bottom of the top box 1;

S2, driving, via the stepping motor 46, the driving bevel gear 45 connected to an output end thereof to rotate, driving the driven bevel gear 44 meshing with the driving bevel gear 45 to rotate, and synchronously rotating the connecting shaft 42 connected to the driven bevel gear 44 and the rotating blade 41 at any time, to fully mix each raw material located in the inner bottom of the top box 1 and obtain an aerogel thermal insulation mortar;

S3, controlling, via the control valve 62, the guide pipe 61 to open, and controlling, via the upper control assembly 63, the upper inlet to open, so that the aerogel thermal insulation mortar enters the inner cylinder 53 from the guide pipe 61, and the exhaust meshes 511 provided at the two ends of the outer cylinder 51 are capable of discharging the gas during the production process of the aerogel thermal insulation mortar;

S4, driving, via the transmission motor 523, the driving toothed disc 522 connected to an output end thereof to rotate, driving the driven toothed disc 524 engaged with the driving toothed disc 522 to rotate, and in turn, the rotary vane 526 on the transmission shaft 525 to rotate synchronously, so as to mix and flow the aerogel thermal insulation mortar located in the inner cylinder 53, improving the mixing efficiency and effect thereof; and S5, when the mixing of the aerogel thermal insulation mortar is completed, controlling, via the lower control assembly 64, the lower outlet to be open, so that the aerogel enters the collection box 12 from the lower outlet, and the whole preparation and collection operation of the aerogel thermal insulation mortar is completed.

The previous description of the disclosed embodiments is provided to enable any person skilled in the art to make or use the present invention. Various modifications to these embodiments will be readily apparent to those skilled in the art, and the generic principles defined herein may be implemented in other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for preparing an aerogel thermal insulation mortar for a high-temperature kiln, comprising a top box (1), a support frame platform (2), a processing mechanism (3), an agitation mechanism (4), a receiving mechanism (5) and a docking mechanism (6), wherein the top box (1) is mounted on the top of the support frame platform (2); the top box (1) is provided with a partition frame (11) capable of respectively dividing an inner space thereof into a first material discharge cavity (7), a second material discharge cavity (8), a third material discharge cavity (9) and a fourth material discharge cavity (10); the processing mechanism (3) is provided on the top of the top box (1) and the bottom of the processing mechanism (3) is provided in the top box (1); the agitation mechanism (4) is mounted on the partition frame (11) and is located at an inner bottom of the top box (1); the receiving mechanism (5) is mounted on an inner top of the support frame platform (2) and docked with the top box (1); the docking mechanism (6) is mounted on the receiving mechanism (5); the inner bottom of the support frame platform (2) is provided with a collection box (12) docked with the receiving mechanism (5); and one side of the top box (1) is provided with a door panel (13); the processing mechanism (3) comprises a lifting assembly (31), a material storage assembly (32) and a filter screen (33), wherein the lifting assembly (31) is mounted at the top of the top box (1); the material storage assembly (32) is arranged at an inner top of the third material discharge cavity (9) and is docked with the filter screen (33); the filter screen (33) is of a semi-spherical structure and is slidably mounted on a side wall of the partition frame (11); and the filter screen (33) is located in the fourth material discharge cavity (10); the lifting assembly (31) comprises a driving cylinder (311), a mounting plate (312), a connecting plate (313), a driving motor (314) and a hemispherical grinding body (315), wherein the mounting plate (312) is fixed on the top of the top box (1); the driving cylinder (311) is fixed on the top of the mounting plate (312); the top of the mounting plate (312) is connected to an output end of the driving cylinder (311); the driving motor (314) is fixed on the connecting plate (313); and an output end of the driving motor (314) is connected to the top of the hemispherical grinding body (315); the material storage assembly (32) comprises a material storage guide box (321), a rotating plate (322) and a rotating motor (323), wherein the top of the top box (1) is provided with a material port in communication with the material storage guide box (321); one side of the material storage guide box (321) is provided with a docking port; the rotating plate (322) is rotatably arranged at the docking port; the rotating motor (323) is mounted on one side wall of the material storage guide box (321); and an output end of the rotating motor (323) is connected to the rotating plate (322); the agitation mechanism (4) comprises a rotating blade (41), a connecting shaft (42), a connecting seat (43), a driven bevel gear (44), a driving bevel gear (45) and a stepping motor (46), wherein the stepping motor (46) is located in the third material discharge cavity (9) and is fixed on the partition frame (11); the driving bevel gear (45) is located in the fourth material discharge cavity (10) and is connected to an output end of the stepping motor (46); the driven bevel gear (44) is fixed on the top end of the connecting shaft (42); the driven bevel gear (44) meshes with the driving bevel gear (45); and the rotating blade (41) is fixed at a bottom end of the connecting shaft (42); the receiving mechanism (5)

comprises an outer cylinder (51), a transmission assembly (52), an inner cylinder (53) and two bearing seats (54), wherein the two bearing seats (54) are mounted on the support frame platform (2) at intervals; the transmission assembly (52) is fixed on the support frame platform (2) and extends to the inner cylinder (53) for arrangement; two ends of the outer cylinder (51) are respectively connected to the two bearing seats (54); the inner cylinder (53) is arranged within the outer cylinder (51); the inner cylinder (53) is of a hollow structure; and an outer side wall of the outer cylinder (51) is provided with an agent inlet pipe (56) in communication with the inner cylinder (53); the transmission assembly (52) comprises an L-shaped plate (521), a driving toothed disc (522), a transmission motor (523), a driven toothed disc (524) and a transmission shaft (525), wherein the L-shaped plate (521) is fixed on an inner side wall of the support frame platform (2); the transmission motor (523) is fixed on the L-shaped plate (521) and an output end of the transmission motor (523) is connected to the driving toothed disc (522); the transmission shaft (525) is rotatably arranged on the outer cylinder (51); one end of the transmission shaft (525) is connected to the driven toothed disc (524); the driven toothed disc (524) meshes with the driving toothed disc (522); a rotary vane (526) is provided on the transmission shaft (525); one end of the rotary vane (526) is in contact with an inner side wall of the inner cylinder (53); both ends of the outer cylinder (51) are provided with an exhaust mesh (511); and both the outer cylinder (51) and the inner cylinder (53) are provided with an upper inlet and a lower outlet; the docking mechanism (6) comprises a guide pipe (61), a control valve (62), an upper control assembly (63) and a lower control assembly (64), wherein two ends of the guide pipe (61) are respectively in communication with the top box (1) and the upper inlet; the control valve (62) is fixed on the guide pipe (61); the upper control assembly (63) and lower control assembly (64) have the same structure; and the upper control assembly (63) is fixed on an inner top of the support frame platform (2) and cooperates with the upper inlet, and the lower control assembly (64) is fixed on the support frame platform (2) and cooperates with the lower outlet; the upper control assembly (63) comprises an arc-shaped plate (631), a boss (632), a guide wheel (633), a bearing plate (634) and a linkage motor (635), wherein the arc-shaped plate (631) is arranged in the inner cylinder (53); the boss (632) is fixed on an outer side wall of the arc-shaped plate (631); the bearing plate (634) is fixed on the support frame platform (2); the linkage motor (635) is fixed on the bearing plate (634) and an output end of the linkage motor (635) is connected to the guide wheel (633); and an outer side wall of the guide wheel (633) is provided with a linkage block (636) connected thereto and one end of the linkage block (636) is connected to the boss (632); the upper control assembly (63) comprises an arc-shaped plate (631), a boss (632), a guide wheel (633), a bearing plate (634) and a linkage motor (635), wherein the arc-shaped plate (631) is arranged in the inner cylinder (53); the boss (632) is fixed on an outer side wall of the arc-shaped plate (631); the bearing plate (634) is fixed on the support frame platform (2); the linkage motor (635) is fixed on the bearing plate (634) and an output end of the linkage motor (635) is connected to the guide wheel (633); and the outer side wall of the guide wheel (633) is provided with a linkage block (636) connected thereto, and one end of the linkage block (636) is connected to the boss (632).

2. The equipment for preparing an aerogel thermal insulation mortar for a high-temperature kiln of claim 1, further comprising the following steps:

- feeding an adhesive, an aerogel powder, a reinforcing agent, and a liquid solvent to the inner bottom of the top box (1) from the first material discharge cavity (7) and the second material discharge cavity (8) respectively, at the same time, (323) driving, via the rotating motor, the rotating plate (322) to rotate and open the docking port, so that the obtained polyphenyl particles located in the material storage guide box (321) fall from the rotating plate (322) into the filter screen (33), and secondly, driving, via the driving cylinder (311), the driving motor (314) on the connecting plate (313) to move downwards; and driving, via the driving motor (314), the hemispherical grinding body (315) connected to an output end thereof to rotate, and then grinding the polyphenyl particles, which then falls from a mesh of the filter screen (33) to the inner bottom of the top box (1);
- driving, via the stepping motor (46), the driving bevel gear (45) connected to an output end thereof to rotate, driving the driven bevel gear (44) meshing with the driving bevel gear (45) to rotate, and synchronously rotating the connecting shaft (42) connected to the driven bevel gear (44) and the rotating blade (41) at any time, to fully mix each raw material located in the inner bottom of the top box (1) and obtain an aerogel thermal insulation mortar;
- controlling, via the control valve (62), the guide pipe (61) to open, and controlling, via the upper control assembly (63), the upper inlet to open, so that the aerogel thermal insulation mortar enters the inner cylinder (53) from the guide pipe (61), and the exhaust meshes (511) provided at the two ends of the outer cylinder (51) are capable of discharging the gas during the production process of the aerogel thermal insulation mortar;
- driving, via the transmission motor (523), the driving toothed disc (522) connected to an output end thereof to rotate, driving the driven toothed disc (524) engaged with the driving toothed disc (522) to rotate, and in turn, the rotary vane (526) on the transmission shaft (525) to rotate synchronously, so as to mix and flow the aerogel thermal insulation mortar located in the inner cylinder (53), improving the mixing efficiency and effect thereof; and
- when the mixing of the aerogel thermal insulation mortar is completed, controlling, via the lower control assembly (64), the lower outlet to be open, so that the aerogel enters the collection box (12) from the lower outlet, and the whole preparation and collection operation of the aerogel thermal insulation mortar is completed.

\* \* \* \* \*